Figure 1:
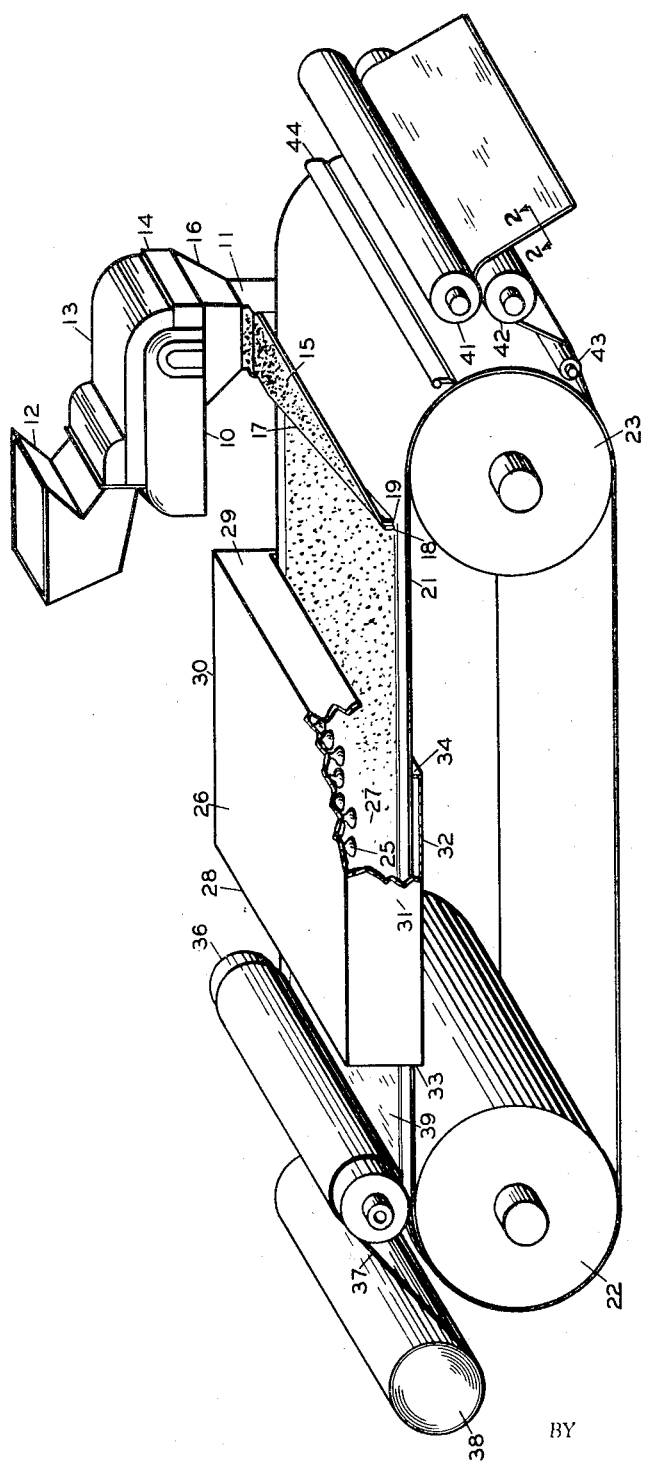

July 4, 1950

J. S. TINSLEY
APPARATUS FOR THE PREPARATION
OF THERMOPLASTIC MATERIALS
Filed Dec. 10, 1946

2,513,434

JOHN S. TINSLEY
INVENTOR.

BY Ernest G. Peterson
AGENT

Patented July 4, 1950

2,513,434

UNITED STATES PATENT OFFICE 2,513,434

APPARATUS FOR THE PREPARATION OF THERMOPLASTIC MATERIALS

John S. Tinsley, Wilmington, Del., assignor to Hercules Powder Company, Wilmington, Del., a corporation of Delaware Application December 10, 1946, Serial No. 715,257

5 Claims. (Cl. 91—54)

This invention relates to the preparation of thermoplastics and more particularly to an improved process and apparatus for the preparation of plastic sheets and plastic coated paper, textiles or other base or filler material.

Various thermoplastic materials in the form of coatings for paper or textiles or in the form of self-supported sheets have found great usefulness in industry. However, the preparation of thermoplastic materials in these forms and particularly in the form of laminates has been attended with many difficulties which have resulted in some cases in inferior products and/or excessive cost and hazards of manufacture.

Thus, in accordance with one method, heretofore used, the preparation of plastic sheets by casting films from solutions containing thermoplastic compositions, has required the use and recovery of expensive solvents. Such solvents are usually inflammable and/or toxic and hence are dangerous to handle. In addition, they require elaborate and expensive apparatus and thus add to the cost of the operation. According to another method the thermoplastic material is formed into large blocks and the plastic sheets sliced from the blocks. By this procedure considerable difficulty is experienced in obtaining uniform sheets, and the sheets obtained usually require subsequent polishing prior to use.

Usual methods for coating bases, such as paper or cloth, with thermoplastic materials have likewise involved various disadvantages. For example, the doping of the base with plastic solution requires the use and removal of expensive and dangerous solvents, with attendant elaborate apparatus, increased costs, and hazards of operation. Where radiant heat has been used to melt thermoplastic powders onto the base by passing the base sprinkled with the powder into the radiantly heated area, there is a great tendency to burn, scorch, or weaken the base before the thermoplastic material is hot enough to adhere thereto in coalesced form. Due to the deleterious effects on the base, this method is impracticable except under exceedingly carefully controlled conditions. There is, therefore, the need for an efficient, rapid and relatively inexpensive method and apparatus for the production of satisfactory products of this nature.

Now, in accordance with this invention, it has been found that highly satisfactory thermoplastic sheets, coatings and/or laminates may be prepared, in the absence of solvents, by a process and apparatus in which the thermoplastic material is first subjected to radiant heat to reduce it to a fused or coalesced state, and then formed into sheets or laminates by pressure. The elimination of solvents and the heating of the plastic by radiant heat prior to its combination with the base material make for a faster, more economical and less hazardous operation with no likelihood of the base material being degraded, scorched or burned.

Generally described, the invention comprises spreading a comminuted thermoplastic composition on a supporting member which is not detrimentally affected by heat, exposing the material to radiant heat until it is at least partially coalesced and then forming a plastic sheet, or contacting it under pressure while still in pressure-sensitive condition with a base material so as to form a continuous or discontinuous coating thereon.

Figure 2:

A preferred embodiment of the invention has been chosen for purposes of illustration and description and is shown in the accompanying drawing, forming a part of the specification wherein: Figure 1 is an isometric view of the plastic sheeting or coating apparatus and Figure 2 is an expanded partial section of supported coated fabric.

Referring to the drawing, the apparatus of the present invention comprises, in its essential parts, a feeding means, a conveying means, a heating means, a pressing or squeezing means, and a stripping means. These means will be specifically described in the order mentioned.

The feeding means is designed to discharge a predetermined weight of molding powder per unit of time evenly and uniformly across the metal conveying belt. In its illustrated form it comprises a mechanism 10 for feeding the material at a uniform rate, and an electric vibrating feeder member 11 for uniformly distributing the material on the belt 21. Mechanism 10 consists essentially of a vibrating feed hopper 12, a measuring and conveying means 13, and a discharge passage 14. The feeder member 11 comprises an elongated substantially triangular shaped flat member 15 which extends transversely of the conveyor belt and is provided at one end with a feed hopper 16. The discharge edge 17 of the member 15 is positioned above a pair of spaced plates 18 and 19, the lower edges of which are closely adjacent to the conveyor belt 21. Suitable means are provided for vibrating the member 15 and feed hopper 16.

In operation the mechanism 10 automatically feeds the material from the hopper 12 to the hopper 16 at a predetermined uniform rate.

From the hopper 16 the material is fed to the vibrating feeder member 15 from which it is discharged uniformly over the edge 17 thereof, downwardly between the spaced plates 18 and 19, and onto the conveying belt 21.

The conveying belt 21 is made of a heat-conducting, heat-resistant material such as steel and preferably a highly polished, stainless steel and is mounted for continuous movement on a pair of horizontally spaced, rotatable pulleys or drums 22 and 23. It is necessary to keep the drums 22 and 23 aligned and of uniform diameter in order to assure uniform plastic thickness on the conveyor belt 21. Any suitable driving mechanism may be utilized to effect continuous movement of the conveying belt 21 at a predetermined uniform rate of speed.

The heating means comprises a plurality of lamps 25 spaced above the belt and surrounded by a hood or casing 26 to form an oven 27. The ends 28 and 29 of the oven extend downwardly to a position just short of the top of the belt. The sides of the oven, designated by the numerals 30 and 31, extend downwardly to a position below the belt and are connected by a bottom portion 32 and end portions 33 and 34. The oven 27 is well insulated, as by the use of asbestos sheets or similar material, to minimize heat losses. The lamps 25 are preferably of the infrared type and are arranged horizontally about 6 to 7 inches above the belt. They may be varied in size, number and arrangement, as well as in distance above the belt, to produce the desired heating effect. Instead of lamps it is possible to use other heating means such as Infralectric Plates made by the Delt-Calesco Company, induction heating or high frequency heating.

The pressing or squeezing means comprises a squeeze roll 36 positioned above the pulley or drum 22 and adapted to be urged downwardly toward the pulley by springs and/or other suitable means. The temperature of the squeeze roll is controlled by passing steam, water or other medium therethrough. Alternatively, the temperature of the roll may be controlled by electrical heating means, by external means such as radiant heat from any suitable source, or by heat from the oven itself such as by swinging the end of the oven out and over the squeeze roll and enclosing the sides so that the oven heat must pass over the roll. Base material 37 from a spool 38 is fed over and around the squeeze roll 36 and is pressed into intimate contact with the fused or softened thermoplastic material 39 after it emerges from the oven.

The stripping means comprises a pair of squeeze or tension rolls 41 and 42 and a stripping roll 43. The rolls 41 and 42 grip the sheet or lamination of material and pull it from the belt and around the stripping roll 43.

The knife or blade 44 scrapes any adherent plastic from the belt which was not removed during the stripping operation.

In operation particles of the thermoplastic material are uniformly distributed on the moving endless belt to form a layer of material 39 of uniform thickness and distribution. The layer of material is then carried into and through the oven where it absorbs sufficient of the radiant heat energy generated by the lamps to become fused or coalesced. In this condition it is carried to the squeeze roll and pressed into the cloth or other base material fed from the spool 38. Or if plastic sheeting alone is desired it is merely pressed into a flat sheet. The pressed material is then cooled as by a blast of cold air and stripped from the roll as heretofore stated.

Having described the invention generally the following examples are given to illustrate specific embodiments thereof.

Example I

A cellulose acetate composition containing 67.5 parts cellulose acetate (53% combined acetic acid and 50 seconds viscosity when measured in 20% solution of 90–10 acetone-alcohol at 25° C.), 26 parts Santicizer M-17, and 6.5 parts triphenyl phosphate were made up into a molding powder of fine particle form and then uniformly distributed across an endless polished metal belt moving at a speed of 3.75 feet per minute. The powder distributed on the belt was carried into a radiantly heated zone provided with a bank of 179 infrared lamps positioned 6 to 7 inches above the belt. The time of passage through the heating zone was about 2⅔ minutes. The temperatures of the metal belt on entering and leaving the heating zone were about 120° F. and 360° F., respectively. The temperature of the plastic as it left the heating zone was about 420° F. After leaving the oven the fused plastic was passed under the squeeze roll where it was pressed into cotton duck. The temperature of the squeeze roll was about 300° F. The coated duck was cooled to about 120° F., stripped from the belt, and formed into a roll.

Example II

A cellulose acetate composition containing 70 parts cellulose acetate (53% combined acetic acid and 50 seconds viscosity when measured in 20% solution of 90–10 acetone-alcohol at 25° C.), 24 parts Santicizer M-17, and 6 parts triphenyl phosphate were made up into a molding powder of fine particle form and then processed as in Example I. The speed of the belt was about 3⅓ feet per minute and the temperature of the belt as it left the heating zone about 390° F. Other conditions were substantially the same as in Example I. The coated fabric was stripped from the belt and formed into a roll.

Example III

Cellulose acetate (69 parts) having an acetic acid content of 53.5% and a viscosity of 60 seconds when measured in 20% solution of 90–10 acetone-alcohol at 25° C., was colloided on a two-roll mill with dimethylphthalate (15.5 parts) and diethylphthalate (15.5 parts) at 65° C. in the presence of 90–10 acetone-alcohol (85 parts). The colloided material was chipped to pass a 20-mesh United States standard screen and then dried in an air oven at 70° C. for 24 hours. The chips so formed were uniformly distributed onto a moving polished endless metal belt and carried into a radiantly heated zone provided with a battery of eighteen 150-watt lamps positioned two inches above the moving belt. The time of passage through the heating zone was about 2 minutes. This time was sufficient to fuse the granules into a continuous sheet covering the metal belt. Upon emergence from the heating zone, the sheet was contacted between squeeze rolls with cotton duck fabric so that the fabric adhered firmly to the plastic. The coated fabric was then stripped from the support and formed into a roll.

Example IV

Ethyl cellulose (85 parts) having an ethoxyl of 48.5% and a viscosity of 100 centipoises in 5% concentration of 80–20 toluene-alcohol at 25° C. was colloided at 150° C. on a two-roll mill with tricresyl phosphate (15 parts). The colloided mixture was chipped to pass a 20-mesh screen and then processed as in Example III.

The coatings applied as set forth in the above examples were smooth and of good quality. No expensive solvents were required, hence the hazards and expense attendant on the use of these materials were not present. The base material was not scorched or otherwise damaged since it was not passed through the heat zone. Laminates prepared from these coated materials were comparable in every respect with those prepared by other methods.

While ethyl cellulose and cellulose acetate have been used to illustrate the invention, any thermoplastic material likewise may be employed. These substances include other cellulose ethers, esters, mixed esters and mixed ethers, such as cellulose acetate butyrate, cellulose acetate propionate, ethyl cellulose acetate, etc.; vinyl polymers and copolymers, such as polyvinyl acetate, polyvinyl butyral, vinyl acetate-chlorides; hydrocarbon polymers, such as polyethylene and polystyrene; natural products such as natural and synthetic rubbers; polyamides, such as the hexamethylene diamine-adipic acid polymers and their homologs, caprolactan polymers and similar polymers; and polyacrylic esters such as derived from methyl methacrylate and the like.

While the invention may be practiced with thermoplastic materials in unmodified form, substances such as plasticizers, waxes, and resins are usually added.

When ethyl cellulose is the thermoplastic material, plasticizers commonly used include phosphates such as tributyl, tricresyl, triphenyl or trioctyl phosphates; mixed phenyl-substituted phenyl phosphates, such as phenyl-xenyl phosphates, phenyl-p-tertiary butyl phosphate, etc.; phthalates such as dimethyl, diethyl, diamyl, or diphenylphthalates; higher fatty acid esters such as butyl or amyl stearates; or exuding-type plasticizers such as mineral oils.

If cellulose acetate is used, the various plasticizers which may be employed include methyl or ethyl phthalyl ethyl glycolate; tartrates such as dibutyl or diamyl tartrate; phthalates such as dimethyl or diethyl phthalate; phosphates such as triphenyl or tributyl phosphate and carbonates such as phenyl diglycol or dibutoxy ethyl carbonate.

Various resins may be used in the thermoplastic compositions. The resins add hardness, rigidity, and mar-resistance to the compositions, and also alter their melting point. It is desirable that they be thermoplastic. Those useful in ethyl cellulose compositions include the glycerol, pentaerythritol or higher polyhydric alcohol esters of rosin, hydrogenated rosin, polymerized rosin or heat-treated rosin, alkyd resins modified with any of the above rosins or heat-treated rosin, alkyd resins, modified rosin-polyhydric alcohol esters, phenol-formaldehyde resins modified with any of the above rosins, 100% phenolic resins, coumarone-indene resins, etc.

Waxes which are useful in these compositions include waxes of petroleum origin, such as the high-melting microcrystalline waxes known as "Barnsdall" wax, "Syncera" wax, "Stanoline"; natural waxes such as carnauba wax, montan wax, and beeswax.

Fillers, pigments, dyes, etc., also may be present in the compositions. In the case of polymers, plasticizers, and resins which have a tendency to degrade, stabilizers may be used. With ethyl cellulose, these include diphenylamine, phenyl-beta-naphthylamine, carbazole, diphenyl guanidine, di-beta-naphthyl-paraphenylenediamine, hydroquinone monobenzyl ether, hydroquinone monomethyl ether, copper salts such a copper naphthenate, cupric sulfate, cupric acetate, etc.

In practicing the invention for the purpose of forming either coatings or plastic sheets, a comminuted thermoplastic composition is prepared by any of the conventional processes known to the art. The usual procedure includes working the ingredients, such as the thermoplastic material, plasticizer, pigment, or other coloring matter, resins, waxes, extenders, etc., on heated rolls so as to compound a homogeneous mixture, chipping the colloided material into granules and, if any solvent was used during the colloiding, drying the granules at a substantially nondegrading temperature. In an alternative procedure the comminuted thermoplastic composition may be prepared by a slurry process such as that disclosed in Patent No. 2,389,940 to John K. Speicher, dated November 27, 1945. Other procedures will be apparent to those skilled in the art and are contemplated as within the scope of the invention.

Although satisfactory results may be obtained when using thermoplastic compositions having a wide variety of particle sizes, it has been found that fine particle sizes of the order of 12 to 80 mesh generally give better distribution and absorption qualities and hence are normally more suitable for the purposes of the present invention. It should be realized, however, that considerable latitude exists in the selection of particle sizes for any particular application.

The granulated thermoplastic composition, prepared in any suitable manner, is then transferred to the distributing or feeding means represented on the drawing by the numerals 10 to 19. Suitable apparatus for the purpose may comprise a combination of the Jeffrey-Traylor Waytrol and Electric Vibrating Spreader Feeder manufactured by the Jeffrey Manufacturing Company, Columbus, Ohio, and illustrated and described on pages 57, 66 and 67 of their Catalogue No. 750. The construction and operation of such apparatus is substantially the same as that represented on Figure 1 by the numerals 10 to 19.

In an alternative form the feeding means may comprise an elongated slotted trough positioned directly above and substantially transversely of the belt or supporting means for the granulated composition. The slot may be located in the bottom or sides of the trough and is preferably designed to provide a continuous opening of restricted size extending substantially across the width of the belt. If desired, the slot may be adjustable to control the amount of material discharged and to accommodate varying sizes of granules, thus providing a control for the thickness of the layer of material formed on the belt.

The belt or supporting means illustrated is in the form of an endless belt or track mounted on suitable rollers, and designed to move at a predetermined speed during operation of the device. It desirably possesses minimum adherence for the thermoplastic material, particularly when not heated to a flowable state, since this permits ready removal of the finished product. A smooth surface on the belt is of great importance in this connection. The use of mold lubricants such as stearic acid or salts thereof, mineral oil, wax, or the like, in the plastic composition and/or lubricants such as mineral oil, etc., applied to the conveyor belt and/or squeeze roll, is also helpful in facilitating removal of the product.

Very satisfactory results have been obtained by the use of a highly polished belt of stainless steel. Chrome plate on a highly polished copper or nickel base also works well. The dimensions of the belt may be varied over wide limits depending upon the circumstances of use and results desired. The width will be somewhat wider than the width of the sheet or laminate being formed. The thickness should be uniform within about ±0.005 inch to give uniform plastic thickness and must be sufficient to prevent stretching or wrinkling while at the same time retaining flexibility. The length must be sufficient to permit the feeding, heating, formation and discharge of the product. In a specific embodiment, a belt about 4 feet wide, 0.05 inch thick and 41 feet long, has been found to work quite well.

When the comminuted thermoplastic composition has been distributed on the support, the latter carries it into the heated zone or oven where it is heated, at least, to the desired point of softness or plasticity. Where a continuous sheet or coating is desired, the granules or particles of material will be heated until substantial coalescence of the very viscous to quite fluid, gummy mass is obtained. Where coating of a base to be laminated is desired, only incipient fusion is needed, i. e., the particles soften, start to lose shape, and become more or less sticky but do not flow.

The degree of heating will, of course, depend to a large extent on the particular material being treated. It will be appreciated that thermoplastics vary widely in heat resistance and in fluidity when heated and that these variables affect the extent to which the material is melted. Thus, cellulose derivatives soften to a very viscous mass, flowing very little under their own weight. These usually are heated to a soft, plastic stage at which adjoining particles sinter by themselves or under slight pressure. Resinous thermoplastics, polyamides, and the like tend to melt to a more fluid state and may, if desired, be heated so as to run together and form a continuous film.

The heat energy is preferably supplied by a bank of infrared lamps positioned above the support for the plastic composition and enclosed in a well-insulated hood or casing whose ends extend downwardly in close proximity to the belt and whose sides and bottom desirably surround the belt. In one specific embodiment a battery of about 179 infrared lamps, fitted with reflectors and set in a suitable frame are positioned about 6 to 7 inches above the belt.

It will be realized, of course, that many variations may be made in the heating means to attain the desired temperatures and heating results. For example, instead of having the lamps in a horizontal bank, those adjacent the center line of the belt may be spaced upwardly a greater distance than those adjacent the sides. This arrangement may in some cases comprise a bank of lamps in the form of an arch or inverted V-shape. Alternatively, the lamps may be progressively smaller in size or wattage as they approach the center line of the belt.

The battery of lamps above the belt will generally be sufficient to heat the belt and plastic material to the desired temperatures. However, where additional heat energy is required or where it is desirable to reduce the intensity of heat energy above the belt or otherwise distribute the heat energy, preheating of the belt before it enters the oven and/or heating of the belt from below as well as from above may be utilized.

The size of the oven is such as to supply the required amount of heat to the belt and plastic material under the conditions of treatment utilized. It is well insulated to minimize heat losses and vented or otherwise constructed to remove plasticizer fumes. Where readily volatile plasticizers are used in the plastic formulations, it may be desirable to employ heated inert gas through the oven.

The degree of fusion of a specific composition is adjusted by (1) varying the distance of the lamps from the support or belt; (2) changing the arrangement, number and capacity of the lamps; (3) controlling the design and size of the heating zone; (4) adjusting the speed of the support through the zone; and (5) varying the amount and color of the comminuted thermoplastic composition distributed on a given area of the belt or support. While the composition may be subjected to a high degree of heat for a short space of time, the same degree of fusion can usually be obtained by heating at a somewhat slower speed for a longer space of time. Assuming that variables (1), (2), (3) and (5) have been fixed, the degree of fusion will then depend on the speed of the belt or support through the heating zone. Under the usual operating conditions this will be such that the thermoplastic material is in the heating zone from about one-half to about five minutes and preferably from one to three minutes. Longer or shorter times may, of course, be used where the other conditions of treatment require it.

Temperatures utilized will depend on the particular material being treated and the conditions of treatment. Higher belt speeds, of course, require higher temperatures than lower belt speeds. A relatively short heating zone requires higher temperatures than a long heating zone. Under any conditions of treatment, however, lower limits of temperature are determined by the necessity of reducing the material to the desired state of fusion; upper limits by the necessity of preventing scorching or otherwise harming the material. When treating a cellulose acetate composition in an apparatus constructed according to this invention it was found that suitable belt temperatures at a belt speed of 2.5 feet per minute varied from about 110° F. to about 120° F. on entering the oven and from about 410° F. to about 420° F. on leaving the oven. Temperature of the plastic on the belt rose to about 450° F. In general exit belt temperatures in the neighborhood of about 100° F. above the flow temperature of the thermoplastic composition are suitable. It will be realized, of course, that these temperatures are only illustrative and that wide variations are possible. When following the teachings of the present invention the proper temperatures to be utilized in any particular case will become apparent to those skilled in the art.

When the material on the belt or support is fused to the desired degree, the moving support carries it out of the heating zone and under the squeeze roll where it meets the cloth, felt or paper to be coated. The fused composition is thereby pressed to the base to be coated or impregnated while it is still in a fluid or pressure-sensitive condition. The thermoplastic composition is desirably hot and soft at the time of contact with the base so that the base may be firmly pressed into the upper surface of the fused material. If the contact is made at this stage, the base and plastic will adhere together firmly and may be easily separated from the original support.

Where a plastic sheet, rather than a laminate is desired, the feed roll 38 is dispensed with and the squeeze roll presses the fused material, without the cloth base, into the form of a sheet of the desired thickness.

In its preferred form the contacting or pressing means comprises a squeeze roll positioned above the pulley or drum for the continuous belt and adapted to cooperate therewith to press the base, plastic and belt or the plastic and belt therebetween. Desirably the squeeze roll is adjustably mounted with respect to the belt pulley so that the clearance therebetween may be regulated. This permits formation of a plastic roll in the nip of the squeeze rolls which in some cases is desirable as an aid in correcting for irregularities of distribution of the material on the belt. The squeeze roll is desirably pressed downwardly toward the lower roll or pulley by springs and a cam mechanism or other suitable means provided for raising the roll upwardly against the action of the springs.

The squeeze roll is preferably maintained at a temperature somewhat lower than the temperature of the plastic and belt in order to facilitate adhesion of the cloth and plastic and to prevent too rapid cooling and/or sticking of the plastic to the roll. Suitable temperatures in this regard may vary from about 50 to about 150° F. less than the temperature of the belt but will in any event be adjusted to secure the desired results set forth above.

Temperature control of the squeeze roll may be maintained in any suitable manner such as by electrical heating means, radiant heating means or by circulating therethrough a heating medium such as steam, water, etc. In some cases the squeeze roll may be maintained at a satisfactory temperature by virtue of the heat picked up from the belt, thus eliminating the necessity for additional heating.

In a slightly modified form of the invention pressing of the plastic may be accomplished by a pair of squeeze rolls, one above and the other below the belt, and positioned between the oven and the pulley for the continuous belt. As before, the cloth or base material may be passed over and around the upper squeeze roll and pressed into intimate contact with the plastic material on the belt.

From the squeeze rolls the plastic coated base or plastic sheet is carried to the other end of the machine where it passes under a pull-off roll and is pulled off between a pair of squeeze or tension rolls. It may then be wound on a spool, cut into sections and stacked or otherwise prepared for subsequent use or disposal. Removal of the plastic from the belt may be facilitated in some cases by cooling the belt in the section below the oven. This may be accomplished in any suitable manner such as by blowing cold air on the belt.

Coating of both sides of the base material or the formation of several laminations of the coated material may be readily accomplished by winding the coated material, as it is stripped from the machine, on a spool or drum and then feeding this material to the machine in place of the base material.

In the preparation of plastic sheeting the procedure is similar to that utilized in the preparation of laminates with the exception that the cloth and cloth feed roll are not used. In this application the upper surface of the sheet may be improved by installing buffers, polishers or rolls to even out the surface and give it the desired degree of polish. Preferably, of course, the supporting or belt means is polished and flat so that the underside of the plastic sheet will have a satisfactory finish and so that it may be more readily removed from the belt.

In an alternative procedure in the preparation of coated bases it may be desirable, in some cases, to lift the plastic from the support in the form of a plastic sheet and subsequently contact it with the base under the proper conditions of temperature and pressure to insure good adherence of the plastic composition to the base.

In another modified procedure the supporting means may be stationary, and the other elements movable. Preferably, in this situation, a movable frame fitted with the heating means, distributing means, and pressing or contacting means is positioned to move above the supporting means.

Any of the usual base materials may be coated with the thermoplastic compositions by means of the present invention. The most suitable materials are textile fabrics, such as cotton, rayon, regenerated cellulose, etc.; paper, such as bleached sulfite, kraft and sulfate pulps; and fireproof fabrics, such as asbestos paper and glass cloth. Felts may likewise be coated or impregnated.

The coated bases prepared according to the present invention may be utilized in unmodified form or may be stacked in layers and formed into laminates of any degree of thickness. The plastic sheets formed according to the invention may be used for any of the purposes well known to the art, such as laminate formation, etc.

An important accomplishment of the present invention is the continuous formation of a layer of fused plastic material, and the continuous coating of a base material with the layer of fused plastic material after the latter has passed through the heating zone. This procedure renders it unnecessary to pass the base material through the heating zone with the attendant hazards of scorching or otherwise damaging the base material. Furthermore, the plastic powder can be allowed to remain under the radiant heat lamps as long as necessary to obtain good fusion with no harmful effects. This makes it possible to obtain a smooth, high quality plastic coating even with the hardest plastics and without the use of solvents and their attendant hazards and expense.

In the specification and claims, the term "support" is used throughout to mean a temporary support for the thermoplastic composition which is separated therefrom after formation of the plastic sheet. The term "base" is used in the sense of any more or less flexible material, such as paper and cloth, which can be coated to form material similar to artificial leather or which may be used for the preparation of laminates and the like, such as paper.

What I claim and desire to protect by Letters Patent is:

1. An apparatus for forming particles of thermoplastic material into a sheet which comprises a smooth heat-resisting endless conveying belt, rotary means for movably supporting the belt, means for distributing particles of the thermoplastic material upon the upper run of the endless conveying belt, a heating zone comprising heating means positioned between the rotary supporting means adjacent the distributing means and adjacent the upper run of the endless conveying belt, means for driving the rotary means whereby the endless conveying belt with the particles of thermoplastic thereon is moved into and through the heating zone to fuse the thermoplastic material, pressing means positioned beyond the heating means and associated with the endless conveying belt to form the fused thermoplastic into a sheet, and means for separating the sheet of thermoplastic from the endless conveying belt.

2. An apparatus for forming particles of thermoplastic material into a sheet which comprises an endless metal band, rotary means for movably supporting the endless metal band, means for distributing particles of the thermoplastic material uniformly upon the upper run of the endless metal band, a fusion zone comprising a source of radiant energy capable of directing sufficient infrared radiation onto the particles of thermoplastic to bring about at least incipient fusion, said fusion zone being positioned between the rotary supporting means adjacent the distributing means and adjacent the upper run of the endless metal band, means for driving the rotary means whereby the endless metal band with the particles of thermoplastic thereon is moved into and through the fusion zone, pressing rolls positioned beyond the fusion zone and associated with the endless metal band to form the fused thermoplastic into a sheet, and means for separating the sheet of thermoplastic from the endless metal band.

3. An apparatus for applying a thermoplastic material to flexible sheeting which comprises a smooth heat-resisting endless conveying belt, rotary means for movably supporting the belt, means for distributing particles of the thermoplastic material upon the upper run of the endless conveying belt, a heating zone comprising heating means positioned between the rotary supporting means adjacent the distributing means and adjacent the upper run of the endless conveying belt, means for driving the rotary means whereby the endless conveying belt with the particles of thermoplastic thereon is moved into and through the heating zone to fuse the thermoplastic material, means positioned beyond the heating means and associated with the endless conveying belt for bringing the sheeting into pressure contact with the thermoplastic material and for maintaining said pressure contact after said thermoplastic material has been passed through the heating zone, and means for separating the sheeting with adherent thermoplastic from the endless conveying belt.

4. An apparatus for applying a thermoplastic material to flexible sheeting which comprises an endless metal band, rotary means for movably supporting the endless metal band, means for distributing particles of the thermoplastic material upon the upper run of the endless metal band, a fusion zone provided with sufficient heat energy absorbable by the band and thermoplastic particles to bring the latter at least to a state of incipient fusion and coalescence comprising heating means positioned between the rotary supporting means adjacent the distributing means and adjacent the upper run of the endless metal band, means for driving the rotary means whereby the endless metal band with the particles of thermoplastic thereon is moved into and through the fusion zone, means positioned beyond the fusion zone and associated with the endless metal band for bringing the sheeting into pressure contact with the thermoplastic material and for maintaining said pressure contact after said thermoplastic material has been passed through the fusion zone, and means for separating the sheeting with adherent thermoplastic from the endless metal band.

5. An apparatus for applying a thermoplastic material to flexible sheeting which comprises an endless metal band, rotary means for movably supporting the endless metal band, means for distributing particles of the thermoplastic material uniformly upon the upper run of the endless metal band, a fusion zone comprising a source of radiant energy capable of directing sufficient infrared radiation onto the particles of thermoplastic to bring about at least incipient fusion, said fusion zone being positioned between the rotary supporting means adjacent the distributing means and adjacent the upper run of the endless metal band, means for driving the rotary means whereby the endless metal band with the particles of thermoplastic thereon is moved into and through the fusion zone, means positioned beyond the fusion zone and associated with the endless metal band for bringing the sheeting into pressure contact with the thermoplastic material and for maintaining said pressure contact after said thermoplastic material has been passed through the fusion zone, and means for separating the sheeting with adherent thermoplastic from the endless metal band.

JOHN S. TINSLEY.

REFERENCES CITED

The following references are of record in the file of this patent:

UNITED STATES PATENTS

| Number | Name | Date |
|---|---|---|
| 423,593 | Carew | Mar. 18, 1890 |
| 986,162 | Gare | Mar. 7, 1911 |
| 1,579,036 | Schwabe | Mar. 30, 1926 |
| 2,219,700 | Perrin | Oct. 29, 1940 |
| 2,296,972 | Alkire et al. | Sept. 29, 1942 |
| 2,304,886 | Conklin et al. | Dec. 15, 1942 |
| 2,321,937 | Quinn | June 15, 1943 |
| 2,355,919 | Lipsius | Aug. 15, 1944 |